United States Patent
Beznos et al.

(10) Patent No.: US 11,250,364 B2
(45) Date of Patent: Feb. 15, 2022

(54) SYSTEM AND METHOD FOR EVALUATING IMAGES TO SUPPORT MULTIPLE RISK APPLICATIONS

(71) Applicants: Vladislav Michael Beznos, Longmeadow, MA (US); Brenda K. Boles, St Petersburg, FL (US); Saira A. Kazmi, Glastonbury, CT (US); Tracey Ellen Steger, Glastonbury, CT (US); Steven J Cultrera, Newington, CT (US)

(72) Inventors: Vladislav Michael Beznos, Longmeadow, MA (US); Brenda K. Boles, St Petersburg, FL (US); Saira A. Kazmi, Glastonbury, CT (US); Tracey Ellen Steger, Glastonbury, CT (US); Steven J Cultrera, Newington, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 221 days.

(21) Appl. No.: 15/833,008

(22) Filed: Dec. 6, 2017

(65) Prior Publication Data
US 2019/0171986 A1    Jun. 6, 2019

(51) Int. Cl.
*G06Q 10/06* (2012.01)
*G06K 9/00* (2006.01)
(Continued)

(52) U.S. Cl.
CPC ..... *G06Q 10/0635* (2013.01); *G06K 9/00624* (2013.01); *G06K 9/6218* (2013.01);
(Continued)

(58) Field of Classification Search
CPC .... G06Q 10/0635; G06Q 40/00; G06Q 40/08; G06K 2009/00738; G06K 9/00624;
(Continued)

(56) References Cited

U.S. PATENT DOCUMENTS 9,026,551 B2    5/2015  Drennan, III
9,483,554 B2   11/2016  Drennan, III
(Continued)

OTHER PUBLICATIONS

"Predictive Modelling for Motor Insurance Claims Using Artificial Neural Networks", by Z. M. Yunos et al., Faculty of Computing, University Teknologi Malaysia, Johor, Malaysia, Int. J. Advance Software Computer Application, vol. 8, No. 3, Dec. 2016. (Year: 2016).*

(Continued)

*Primary Examiner* — Pan G Choy
(74) *Attorney, Agent, or Firm* — Buckley, Maschoff & Talwalkar LLC

(57) ABSTRACT

In some embodiments, image input data is received from multiple sources. The received image input data may then be aggregated and mapped to create a set of image input data. An event in the set of image input data may be automatically detected, such as by being triggered by a rule and an associated tag. An image mining result database may be updated by adding an entry to the database identifying each detected event and the triggering rule. An indication associated with the image mining result database may then be transmitted to a plurality of risk applications.

21 Claims, 16 Drawing Sheets

(51) Int. Cl.
*G06K 9/62* (2006.01)
*G06N 5/02* (2006.01)
*G06F 16/58* (2019.01)
*G06Q 40/08* (2012.01)
*G06Q 40/00* (2012.01)

(52) U.S. Cl.
CPC ............ *G06K 9/6292* (2013.01); *G06N 5/02* (2013.01); *G06Q 40/00* (2013.01); *G06Q 40/08* (2013.01); *G06F 16/58* (2019.01); *G06F 2216/03* (2013.01); *G06K 2009/00738* (2013.01)

(58) Field of Classification Search
CPC .... G06K 9/6218; G06K 9/6292; G06F 16/58; G06F 2216/03; G06N 5/02
See application file for complete search history.

(56) References Cited

U.S. PATENT DOCUMENTS

| | | | | |
|---|---|---|---|---|
| 9,786,011 | B1* | 10/2017 | Engelhorn | G06K 9/6202 |
| 9,792,655 | B2 | 10/2017 | Griffin et al. | |
| 10,043,102 | B1* | 8/2018 | Goenka | G06F 16/583 |
| 10,102,586 | B1* | 10/2018 | Marlow | G06Q 40/08 |
| 10,529,028 | B1* | 1/2020 | Davis | G06Q 40/08 |
| 2001/0026377 | A1* | 10/2001 | Ikegami | G06T 1/0021 |
| | | | | 358/401 |
| 2005/0041035 | A1* | 2/2005 | Nagatomo | G06T 3/40 |
| | | | | 345/601 |
| 2007/0153790 | A1* | 7/2007 | Boers | H04L 45/04 |
| | | | | 370/390 |
| 2014/0365463 | A1 | 12/2014 | Tusk | |
| 2015/0310557 | A1 | 10/2015 | Engelhorn | |
| 2015/0363717 | A1* | 12/2015 | Lim | G06Q 40/08 |
| | | | | 705/4 |
| 2016/0328616 | A1* | 11/2016 | Drako | G08B 13/19613 |
| 2017/0039656 | A1 | 2/2017 | Drennan, III | |
| 2017/0109830 | A1* | 4/2017 | Macciola | G06Q 50/18 |
| 2017/0303844 | A1* | 10/2017 | Baker | A61B 5/444 |
| 2017/0364537 | A1* | 12/2017 | Kariman | G06Q 10/0635 |
| 2018/0068019 | A1* | 3/2018 | Novikoff | G06F 16/738 |
| 2018/0189122 | A1* | 7/2018 | Jobi | G06F 9/455 |

OTHER PUBLICATIONS

"Technology-Driven value Generation in Insurance Industry Report", Oliver Wyman et al., marsh & McLennan Companies, 2017. (Year: 2017).*

"Applying Image Recognition to Insurance", by Kailan Shang, Society of Actuaries Research Expanding Boundaries Pool,2018 Society of Actuaries. (Year: 2018).*

* cited by examiner

| IMAGE MINING RESULT IDENTIFIER 902 | LOSS EVENT 904 | DATE 906 | RULE IDENTIFIER 908 | CLAIM IDENTIFIER 910 |
|---|---|---|---|---|
| IMR_10001 | HURRICANE | 7/19/2020 | ER_100001 | C_4389923 |
| IMR_10002 | FRONT FENDER | 4/21/2024 | ER_100010 | C_8782378 |
| IMR_10003 | ACCIDENT | 11/30/2029 | ER_100093 | C_1348933 |
| IMR_10004 | SLIP AND FALL | 1/14/2026 | ER_100010 | C_2372978 |
| IMR_10009 | WATER DAMAGE | 7/19/2026 | ER_100077 | C_0983778 |

*FIG. 9*

SYSTEM AND METHOD FOR EVALUATING IMAGES TO SUPPORT MULTIPLE RISK APPLICATIONS

BACKGROUND

An entity, such as an enterprise that analyzes risk information, may want to analyze or "mine" large amounts of data, such as image data. For example, a risk enterprise might want to analyze tens of thousands of image files to look for patterns (e.g., a particular type of damage has occurred more frequently under particular circumstance). Note that an entity might analyze this data in connection with different types of risk-related applications, and, moreover, different applications may need to analyze the data differently. For example, a picture of a business or residence might have different meanings depending on the types of risk being evaluated. It can be difficult to identify patterns across such large amounts of data and different types of applications. In addition, manually managing the different needs and requirements (e.g., different business logic rules) associated with different applications can be a time consuming and error prone process. As a result, it would be desirable to provide systems and methods for efficiently and accurately mining image data in connection with risk-related applications.

SUMMARY OF THE INVENTION

According to some embodiments, systems, methods, apparatus, computer program code and means are provided for efficiently and accurately mining image data. In some embodiments, image input data is received from multiple sources. The received image input data may then be aggregated and mapped to create a set of image input data. An event in the set of image input data may be automatically detected, such as by being triggered by a rule and an associated tag. An image mining result database may be updated by adding an entry to the database identifying each detected event and the triggering rule. An indication associated with the image mining result database may then be transmitted to a plurality of risk applications.

Some embodiments provide: means for receiving, at an image mining platform, image input data from multiple sources; means for aggregating and mapping the image input data to create a set of image input data; means for automatically detecting, by a computer processor of the image mining platform, an event in the set of image input data triggered by a rule and an associated tag; means for updating, by the computer processor, an image mining result database by adding an entry to the database identifying each detected event and the triggering rule; and means for transmitting, by the computer processor, an indication associated with the image mining result database to a plurality of risk applications.

A technical effect of some embodiments of the invention is an improved and computerized way of mining image information to provide improved results for risk-related applications. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 9 illustrates a tabular portion of an image mining results database in accordance with some embodiments.

DETAILED DESCRIPTION

The present invention provides significant technical improvements to facilitate a monitoring and/or processing of image-related data, predictive image and risk related data modeling, and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the areas of image monitoring and/or processing by providing benefits in data accuracy, analysis speed, data availability, and data integrity, and such advances are not merely a longstanding commercial practice. The present invention provides improvement beyond a mere generic computer implementation as it involves the processing and conversion of significant amounts of data in a new beneficial manner as well as the interaction of a variety of specialized risk-related applications and/or third-party systems, networks and subsystems. For example, in the present invention image and related risk information may be processed, forecast, and/or predicted via an analytics engine and results may then be analyzed efficiently to evaluate risk-related data, thus improving the overall performance of an enterprise system, including message storage requirements and/or bandwidth considerations (e.g., by reducing a number of messages that need to be transmitted via a network). Moreover, embodiments associated with predictive models might further improve the performance of claims processing applications, resource allocation decisions, reduce errors in templates, improve future risk estimates, etc.

An enterprise may want to analyze or "mine" large amounts of data, such as image data received from various sources. By way of example, a risk enterprise might want to analyze tens of thousands of risk-related image files to look for patterns (e.g., to find patterns of factors that may help indicate difficult it will be to repair or mitigate various negative impacts for a client). Note that an entity might analyze this data in connection with different types of risk-related applications, and that different applications may need to analyze the data differently. It may therefore be desirable to provide systems and methods to mine image data for risk-related applications in an automated, efficient, and accurate manner.

Figure 1:
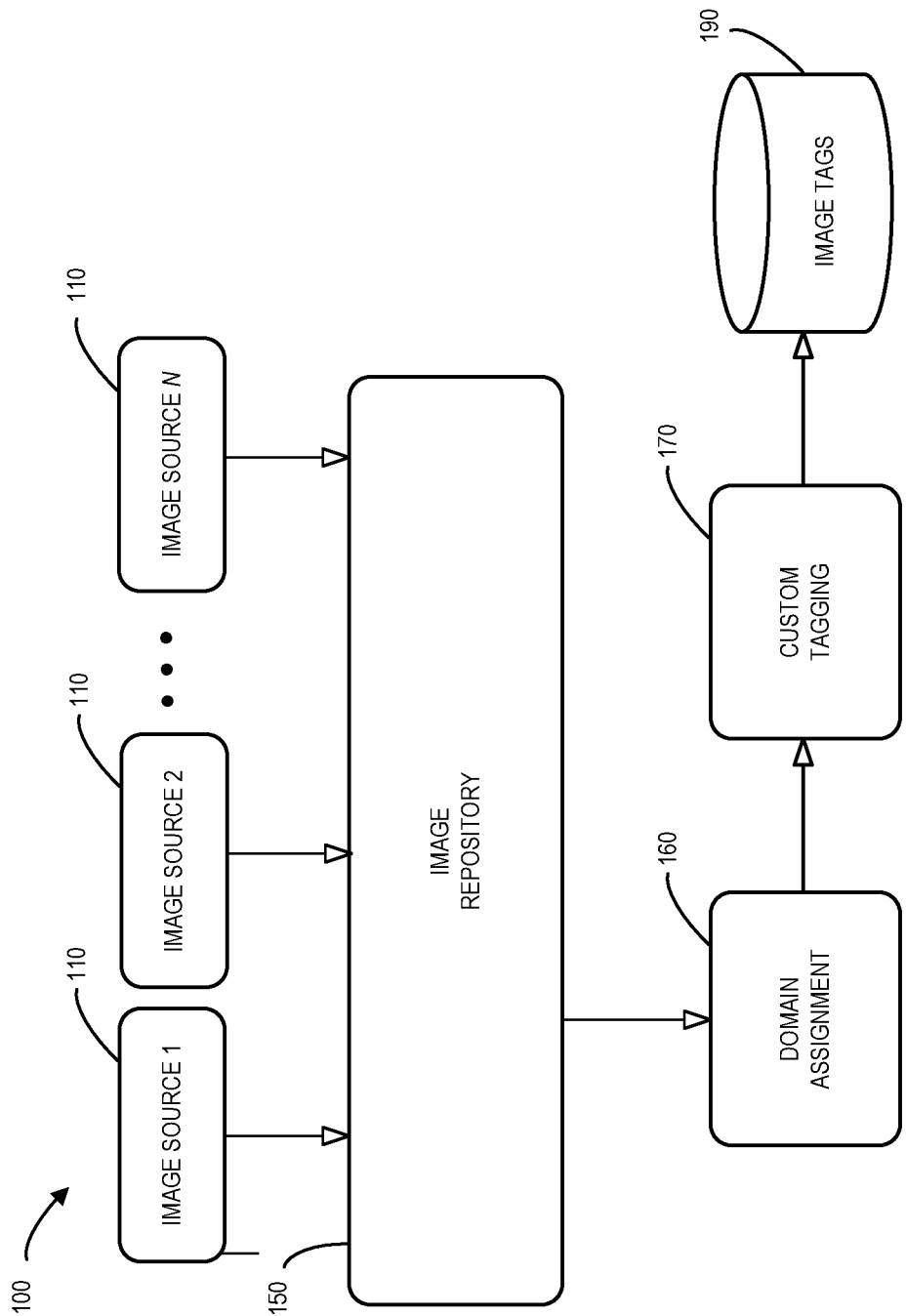
FIG. 1 is block diagram of a system according to some embodiments of the present invention.

FIG. 1 is block diagram of a system 100 according to some embodiments of the present invention. An image repository 150 may receive and store image data from various image sources 110 (e.g., image sources 1 through N illustrated in FIG. 1). As used herein, the phrase "image information" may refer to any representation of visual data including photographs (e.g., Joint Photographic Experts Group ("JPEG") files, Exchangeable Image File ("EXIF") data, Tagged Image File Format ("TIFF") files, Graphics Interchange Format ("GIF") files, bitmap ("BMP") files, Portable Network Graphics ("PNG") files, etc.), drawings, video files (e.g., Audio Video Interleave ("AVI") files, Flash Video Format ("FVL") data, Windows Media Video ("WMV") files, Apple QuickTime Movie ("MOV") data, Moving Pictures Expert Group 4 ("MPG4") files, etc.), streams of visual information, etc. Note that image information may represent uncompressed or compressed data, lossy or lossless compression techniques, etc. Image information might be generated via, for example, a camera, a smartphone, a video camera, a drone (e.g. to record images of a building roof), etc. Image information might include color images, black and white images, infrared images, etc.

Ingestion of image information into the image repository 150 may include key assignment and ingestion of existing tags (e.g., latitude and longitude) that are associated with the images. Information from the image repository 150 may then be processed to determine an appropriate domain assignment 160 (e.g., using general image tag learning and artificial intelligence) and custom tagging 170 (e.g., using custom image tags and feedback from users) to create a broad set of image tags to be stored in an image tag database 190.

Figure 2:
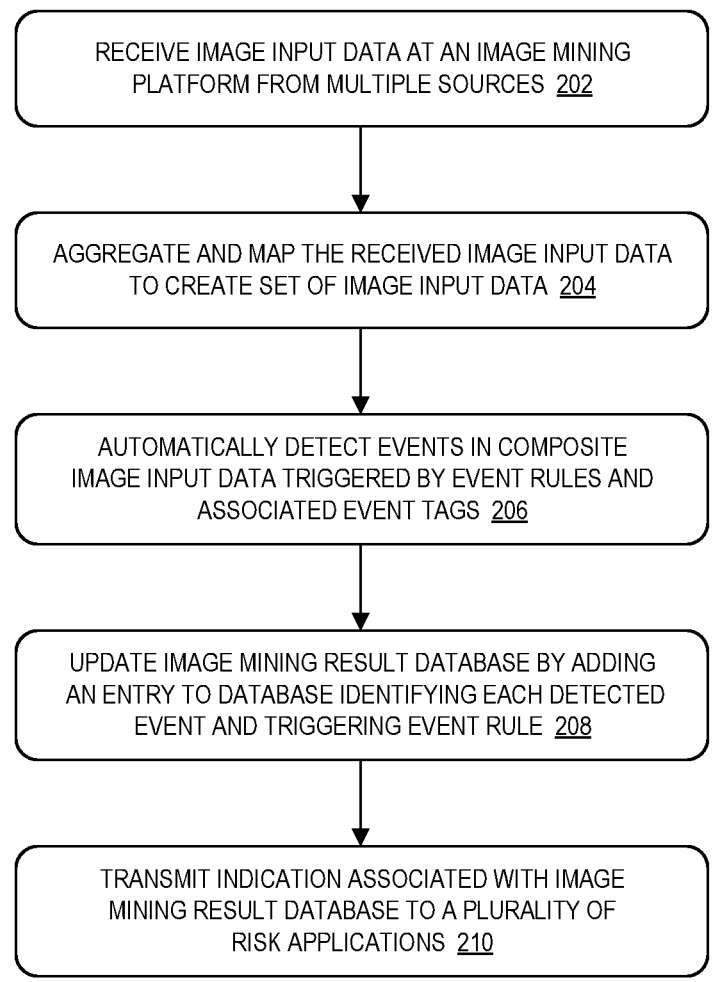
FIG. 2 illustrates a method in accordance with some embodiments of the present invention.

In this way, the system 100 may mine image information in an efficient and accurate manner. For example, FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 202, image input data is received at an image mining platform from multiple sources. For example, thousands of risk files (e.g., associated with insurance claims or other types of risk-related data) may be received on a periodic basis or in substantially real time. Although risk files are described in connection with some embodiments herein, note that other types of information may also be received and/or analyzed. For example, the image input data might be associated a risk note, a medical report, a police report, social network data, web image data, Internet of Things ("IoT") data, Global Positioning System ("GPS") satellite data, activity tracking data, a loss description, an injury description, an image associated with a Final Notice Of Loss ("FNOL") statement, a video chat or teleconference, third-party data, and/or a governmental agency (e.g., satellite photos).

At 204, the received image input data is aggregated and mapped to create composite input image data. For example, the received image input data might be rearranged, converted into a standard format, fields may be mapped in accordance with a source identifier, common items within the images may be identified and/or extracted, etc.

At 206, an event may be automatically detected in the set of image input data triggered by a rule and an associated tag. According to some embodiments, the event may be associated with the triggering detection of an item, such as a building, an automobile, a street sign, etc. The triggering rule might be associated with, for example, multiple sub-items being detected within a single image (e.g., both an automobile and broken glass, ice on a staircase, etc.). According to some embodiments, the triggering rule was previously defined by an administrator using a graphical user interface. In some cases, one or more pre-determined conditions may be applied to flag the detected event (e.g., to reduce the number of events to be eventually reported to risk applications). For example, a pre-determined condition may require that an item must be detected a pre-determined number of times or within a pre-determined proximity of another item.

An image mining result database may be updated at 208 by adding an entry to the database identifying each detected event and the triggering rule (note that, if applicable, only flagged events may result in a new entry being created in the database). The added entry might, for example, include an image identifier, an insert date, an image source, a rule identifier, and/or a line of business.

At 210, an indication associated with the image mining result database may be transmitted to a plurality of risk applications. The risk applications might be associated with, for example, a workers' compensation claim, a personal risk policy, a business risk policy, an automobile risk policy, a home risk policy, a sentiment analysis, risk event detection, a cluster analysis, a predictive model, a subrogation analysis, fraud detection, a recovery factor analysis, large loss and volatile claim detection, a premium evasion analysis, a risk policy comparison, an underwriting decision, and/or indicator incidence rate trending application. Note that the transmitted indication might be used to trigger a risk application (e.g., by triggering a fraud detection analysis) and/or update a risk application (e.g., by updating a variable or weighing factor of a predictive model). According to some embodiments, the system may then receive, from at least one of the risk applications, feedback information associated with the detected event. Based on the received feedback information, the system may automatically update at least one of the rule and the associated tag. For example, a rule or tag might be automatically updated to improve operation of the system when it is detected that underwriters are constantly correcting an image data evaluation in a particular way. That is, manual adjustments to and corrections of image processing results may be automatically used by the system to learn how to improve the rules and associated tags that are generated in future evaluations.

Figure 3:
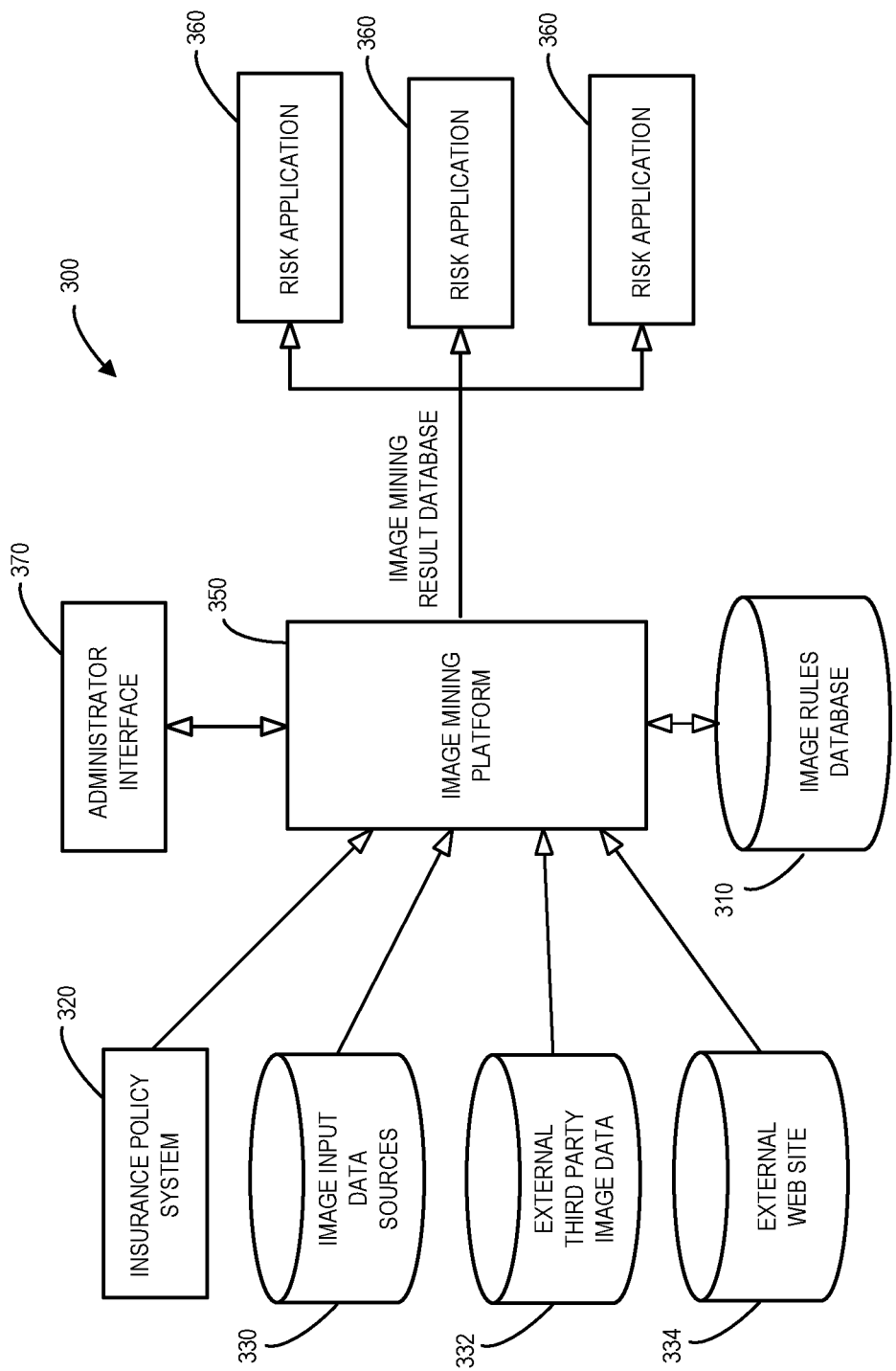
FIG. 3 is a more detailed implementation of a system according to some embodiments.

FIG. 3 is block diagram of a system 350 according to some embodiments of the present invention. In particular, the system 300 includes an image mining platform 350 that receives information from an image rules database 310, an insurance policy system 320 (e.g., associated with a claims process, appraisal process, underwriting process, etc.), one or more image input data sources 330 (e.g., internal to a risk enterprise), external third-party image data 332 (e.g., automobile safety reports issued by the National Highway Safety Board), and/or image data from an external web site 334. The image mining platform 350 might be, for example, associated with a Personal Computers ("PC"), laptop computer, an enterprise server, a server farm, and/or a database or similar storage devices. The image mining platform 350 may, according to some embodiments, be associated with a business organization or a risk-related enterprise.

As used herein, devices, including those associated with the image mining platform 350 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" image mining platform 350 may access rules in the image rules database 310 to mine the information from the insurance policy system 320 and/or the other image input data sources 330. As used herein, the term "automated" may refer to, for example, actions that can be performed with little or no human intervention.

The image mining platform 350 may store information into and/or retrieve information from the image rules database 310 and/or an image mining result database that is output to various external risk applications 360 (e.g., software applications or devices associated with subrogation, fraud detection, and/or recovery factor analysis). The image rules database 310 may be a locally stored relational database or reside remote from the image mining platform 350. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface 370 may provide an ability to access and/or modify the image rules database 310 via the image mining platform 350. The administrator interface 370 might, for example, let an administrator define terms, picture dictionaries, mapping rules, etc. associated with image mining. The data sources 330, 332 may be thought of as "publishers" of information to be consumed by the image mining platform 350, and the risk applications 360 may be considered "subscribers" to information created by the image mining platform 350. Moreover, note that the image mining platform 350 may operate asynchronously and/or independently of any risk application 360.

Although a single image mining platform 350 is shown in FIG. 3, any number of such devices may be included. Moreover, various devices described herein might be combined according to embodiments of the present invention. For example, in some embodiments, the image mining platform 350 and image rules database 310 might be co-located and/or may comprise a single apparatus.

Figure 4:
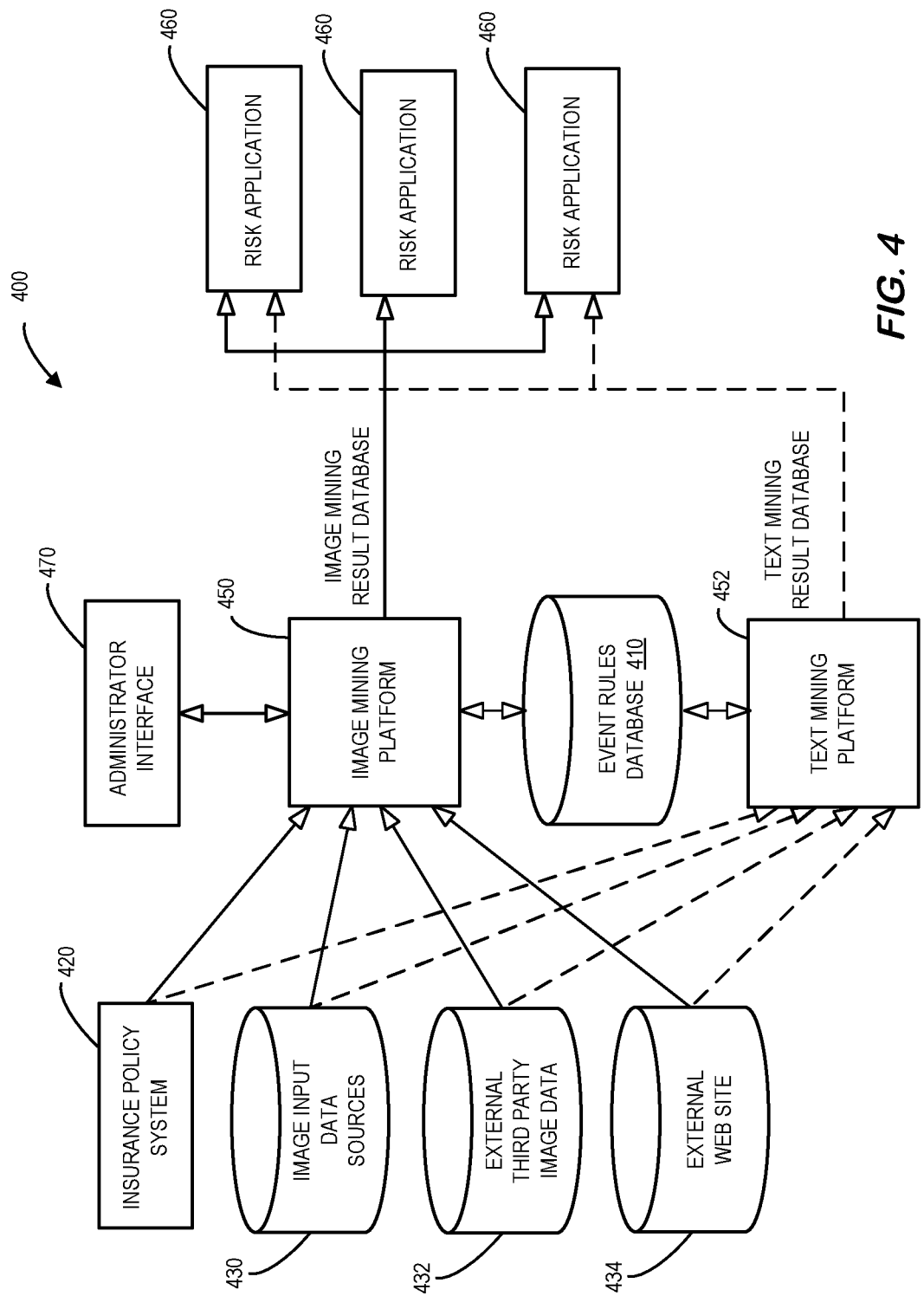
FIG. 4 is an example of a system to process images and text in accordance with some embodiments.

Note that a mining platform may process other types of data in addition to image information. For example, FIG. 4 illustrates a system 400 to process images and text in accordance with some embodiments. As before, the system 400 includes an image mining platform 450 that receives information from an event rules database 410, an insurance policy system 420, one or more image input data sources 430 (e.g., internal to a risk enterprise), external third-party image data 432 (e.g., weather maps), and/or data from an external web site 434. According to some embodiments, an automated image mining platform 450 may access rules in the event rules database 410 to mine the information from the insurance policy system 420, the other image input data sources 430, the external third party image data 432, and/or the external web site 434.

In this embodiment, the system 400 further includes a text mining platform 452 that also receives information from the event rules database 410, the insurance policy system 420, the image input data sources 430 (e.g., internal to a risk enterprise), the external third-party image data 432 (e.g., weather maps), and/or the external web site 434. The text mining platform 452 may store information into and/or retrieve information from the event rules database 410 and/or a text mining result database that is output to the various external risk applications 460.

According to some embodiments, the text mining platform 452 may use Natural Language Processing ("NLP") to parse data streams into phrases and Named Entity Recognition ("NER") rules may identify important concepts that are used to augment other structured data elements as predictor variables in models. The NER rules may be stored in an NER rule library and may include individual indicators. For example, indicators associated with a subrogation analysis might include the following words or phrases: animal bite, attorney, carrier, contractor, landlord, lawsuit, low subrogation, motor vehicle accident, no subrogation, off premises, responsible party, self-inflicted, third-party, and/or zero paid. As other examples, indicators associated with a fraud detection analysis might include the following words or phrases: disputed injury, no evidence, pre-existing condition, prior history, recent hire, terminated, unhappy, un-witnessed injury, claimant lacks documentation, claimant not employee, claimant paid in cash, no Social Security number, employer paid un-reported bill, employer won't confirm information, hazardous material, and/or excluded business. As still other examples, indicators associated with a recovery factor analysis might include: alcohol, complications, diabetes, high blood pressure, narcotics, pre-existing condition, obesity, osteoarthritis, smoking, substance abuse, and/or elderly care. Note that embodiments could further include audio mining platforms as well as other types of mining platforms.

Figure 5:
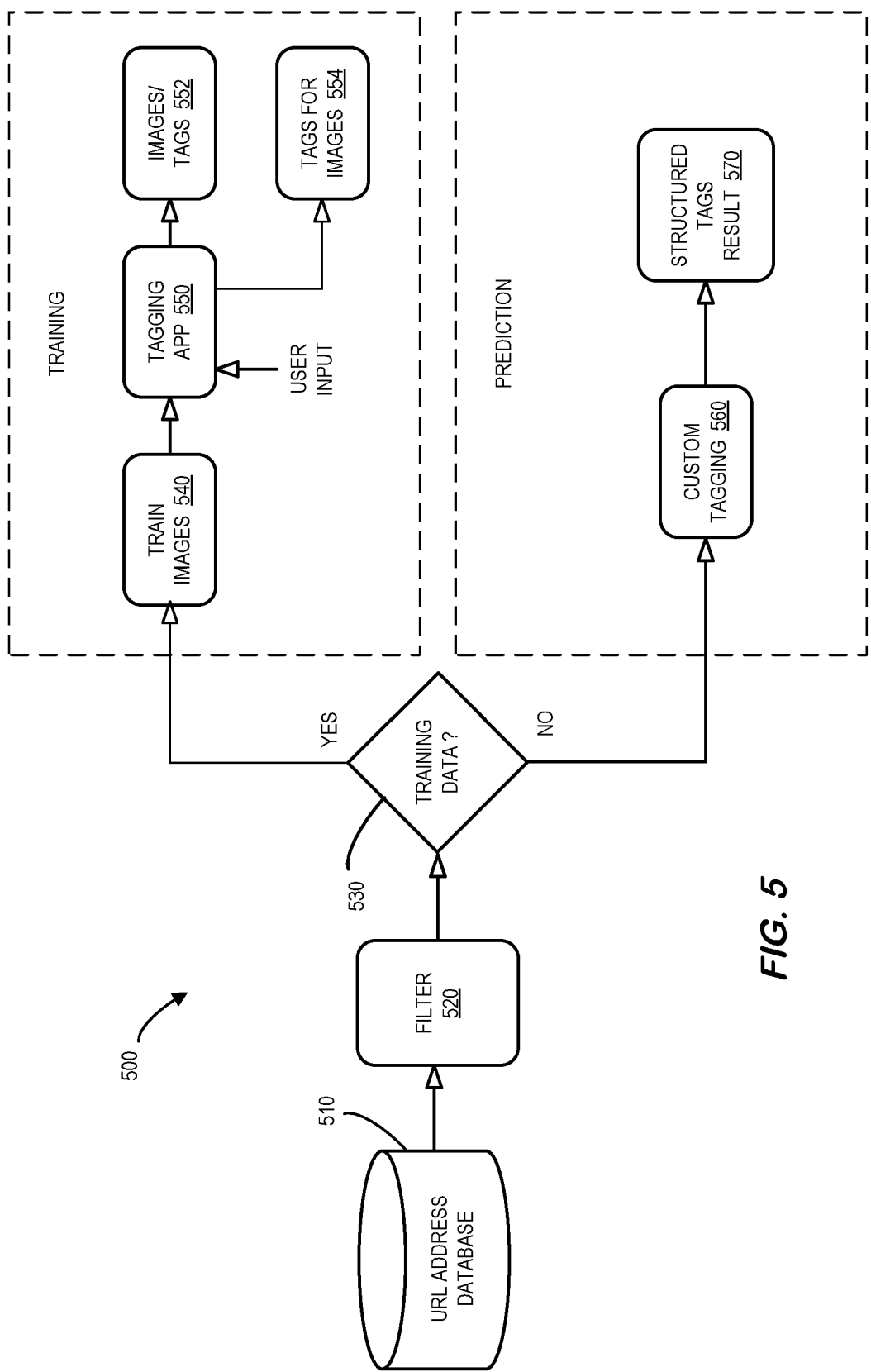
FIG. 5 is a vision process flow that might be implemented according to some embodiments.

FIG. 5 is a vision process flow 500 that might be implemented according to some embodiments. A Uniform Resource Locator ("URL") address database 510 may store the location of a substantial number of image files (e.g., via cloud-based storage). A filter 520 might be applied to that set of images (e.g., in connection with general image tag learning and/or a console application) and the results of the filter 520 are separated into training data and non-training data (that is, images that are to be used for prediction) at 530. Images determined to be training data at 530 might be, for example, written to object storage, such as a Binary Large Object ("BLOB") storage training folder, and used by a train image process 540. A tagging application 550 may assign short words or identifiers ("tags") to images as appropriate (e.g., in some cases by having users tag images through a web interface) and the images and associated tags 552 may be output (e.g., in connection with a custom image tag application or process). The set of tags for images 554 may also be output (e.g., to be stored in a Structured Language Query ("SQL") database and/or cloud-based storage). Images determined to be non-training data at 530 may be tagged by a custom tagging 560 application or process, and the resulting structured tags result 570 may be output (e.g., to be stored in an SQL database and/or cloud-based storage).

Figure 6:
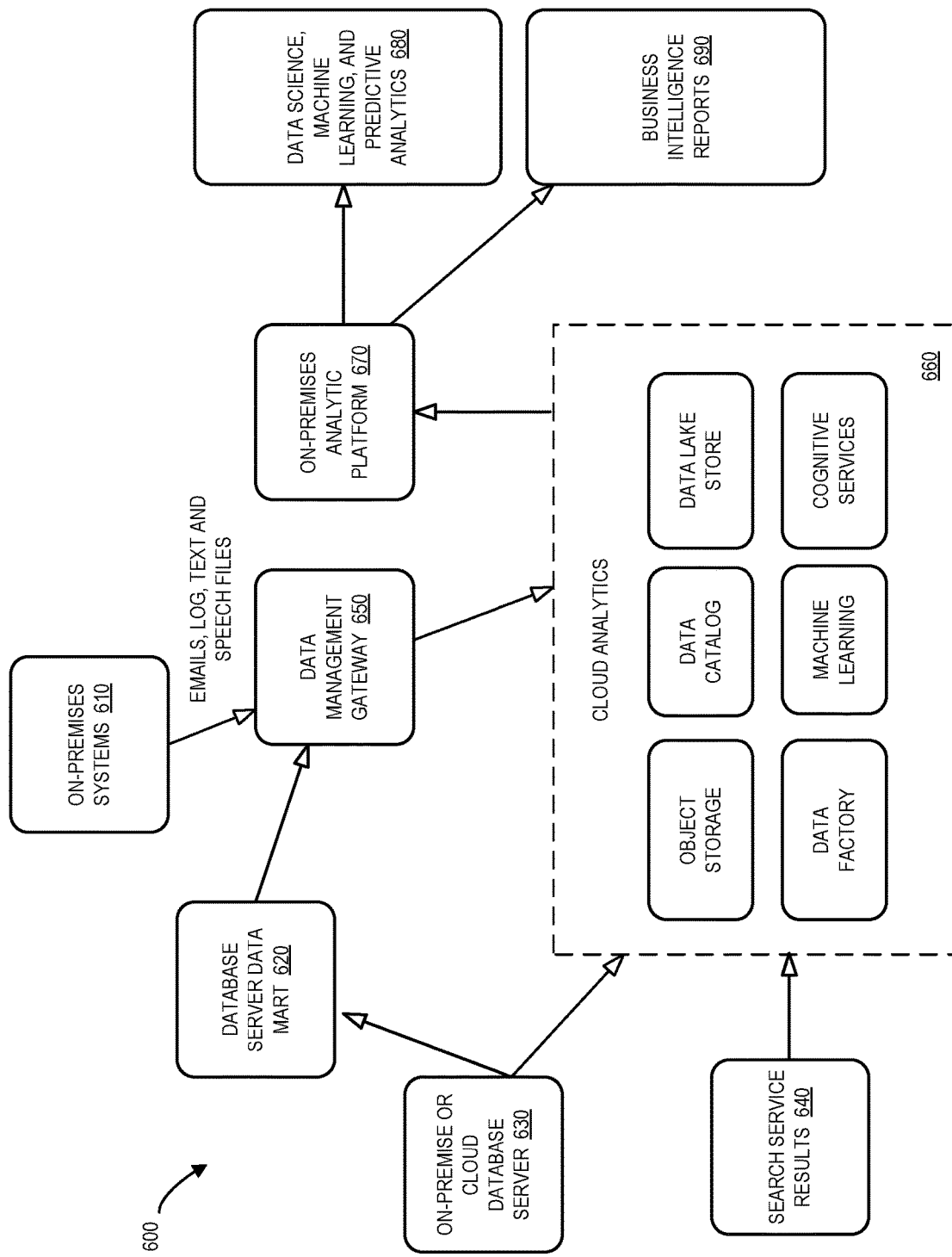
FIG. 6 illustrates an implementation of a machine learning, big data predictive analytics, and reporting platform in accordance with some embodiments.

FIG. 6 illustrates an implementation 600 of a machine learning, big data predictive analytics, and reporting platform in accordance with some embodiments. In particular, on-premises systems 610 (e.g., systems physically located at a business or other enterprise) may provide data to cloud analytics 660 via a data management gateway 650 (e.g., images associated with emails, log files, text, and speech files, etc.). The cloud analytics 660 may also receive data from an on-premise or cloud database server 630 (either through the data management gateway 650 and a database server data mart 620 or directly from the database server 630 itself). According to some embodiments, the cloud analytics 660 may include object storage, data catalogs, data lake stores, data factories, machine learning processes, artificial intelligence or machine learning services, etc. Note that the cloud analytics 660 might be associated with other functionality, including database databases, Java processes, chat bots, intelligent applications, in-memory storage cubes (e.g., associated with SQL Server Analysis Services ("SSAS")), business intelligence or analytics processing, predictive web services, etc. According to some embodiments, the cloud analytics 660 might receive other types of external data, including web search service requests and/or results 640.

The cloud analytics 660 may generate output for an on-premises analytic platform 670. Note that the on-premises analytic platform 670 might also receive other information, including third-party data (e.g., from a weather service). The on-premises analytic platform 670 may then process the receive information and transmit results to data science, machine learning, and predictive analytics 680 and/or business intelligence reports 690 (e.g., hosted by an SQL Server Reporting Service ("SSRS")).

Figure 7:
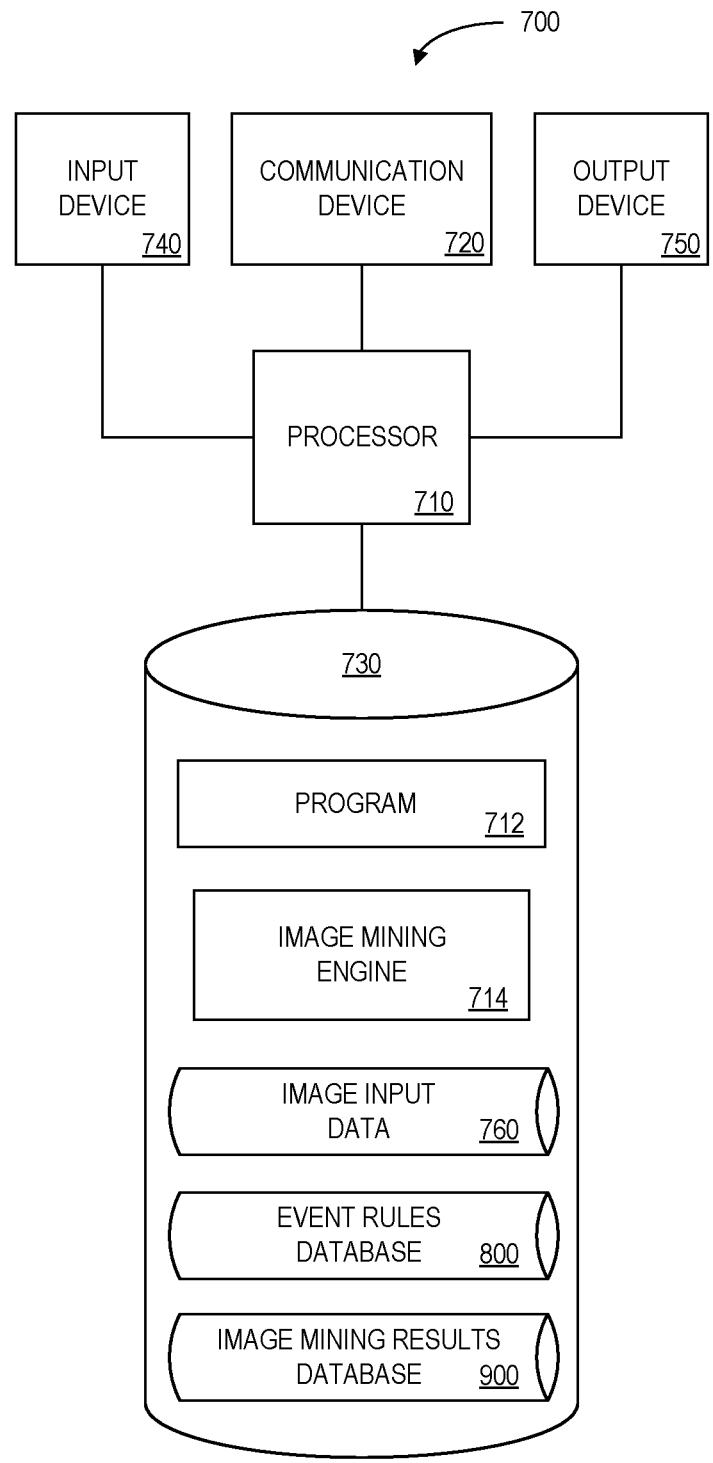
FIG. 7 is block diagram of an image mining platform according to some embodiments of the present invention.

The embodiments described herein may be implemented using any number of different hardware configurations. For example, FIG. 7 illustrates an image mining apparatus 700 that may be, for example, associated with the image mining platform 350 of FIG. 3 as well as the other systems described herein. The image mining apparatus 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more image sources and/or risk applications. The image mining apparatus 700 further includes an input device 740 (e.g., a mouse and/or keyboard to define image rules and events) and an output device 750 (e.g., a computer monitor to display reports and image mining results to an administrator).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or an image mining engine 714 (e.g., associated with an image mining engine plug-in) for controlling the processor 710. The processor 710 performs instructions of the programs 712, 714, and thereby operates in accordance with any of the embodiments described herein. For example, the processor 710 may receive image input data and an event in the image input data may be automatically detected, such as by being triggered by a rule and an associated tag. An image mining result database 900 may then be updated by the processor 710 (e.g., by adding an entry to the database 900 identifying each detected event and the triggering rule). An indication associated with the image mining result database 900 may then be transmitted by the processor 710 to a plurality of risk applications.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the image mining apparatus 700 from another device; or (ii) a software application or module within the image mining apparatus 700 from another software application, module, or any other source.

In some embodiments (such as shown in FIG. 7), the storage device 730 further stores image input data 760, an event rules database 800, and the image mining results database 900. Examples of databases that may be used in connection with the image mining apparatus 700 will now be described in detail with respect to FIGS. 8 and 9. Note that the database described herein is only one example, and additional and/or different information may be stored therein. Moreover, various databases might be split or combined in accordance with any of the embodiments described herein.

Figure 8:
FIG. 8 illustrates a tabular portion of a rules database in accordance with some embodiments.

Referring to FIG. 8, a table is shown that represents the event rules database 800 that may be stored at the image mining apparatus 700 according to some embodiments. The table may include, for example, entries identifying rules and algorithms that may facilitate image mining. The table may also define fields 802, 804, 806 for each of the entries. The fields 802, 804, 806 may, according to some embodiments, specify: an event rule identifier 802, a rule description 804, and one or more image tags 806 for each rule. The event rules database 800 may be created and updated, for example, based on information received from an operator or administrator.

The event rule identifier 802 may be, for example, a unique alphanumeric code identifying logic that may be applied during image mining. The rule description 804 may describe the rule and the one or more image tags 806 may define when the rule is triggered. For example, the presence of "STAIRS" and "ICE" in images associated with a claim file might trigger the rule associated with identifier "ER10003" to indicate that a "STAIRCASE" might be associated with that claim file. According to some embodiments, the event rules database 800 may store multiple versions of a rule (and different rule versions may be associated with different image mining results databases 900 versions). Other examples of event rules might indicate, for example, that a window automatically detected in an image has broken glass, safety bars, etc. that might be used to facilitate an underwriting process.

Referring to FIG. 9, a table is shown that represents the image mining results database 900 that may be stored at the image mining apparatus 700 according to some embodiments. The table may include, for example, entries identifying results of an image mining operation. The table may also define fields 902, 904, 906, 908, 910 for each of the entries. The fields 902, 904, 906, 908, 910 may, according to some embodiments, specify: an image mining result identifier 902, a loss event 904, a date 906, a rule identifier 908, and a claim identifier 910. The image mining results database 900 may be created and updated, for example, based on an analysis of image input data received from multiple sources. Note that image mining operations and analysis might be performed on historical image input data in addition to, or instead of, current image input data.

The image mining result identifier 902 may be, for example, a unique alphanumeric code identifying a result of image analysis. The loss event 904 might categorize a cause associated with the event and the date 906 might indicate when the loss occurred. The rule identifier might indicate which event rule resulted in the entry being created and may be based on, or associated with, the event rule identifier 802 stored in the event rule database 800. The claim identifier 910 might indicate a claim file associated with the event and/or an associated insurance policy. Note that other identifiers may be stored in the image mining results database in addition to, or instead of, the claim identifier 910. Examples of such other identifiers include a party identifier, a policy identifier, an entity identifier, a tax identifier, a physician identifier, a latitude and longitude, a postal address, etc.

Figure 10:
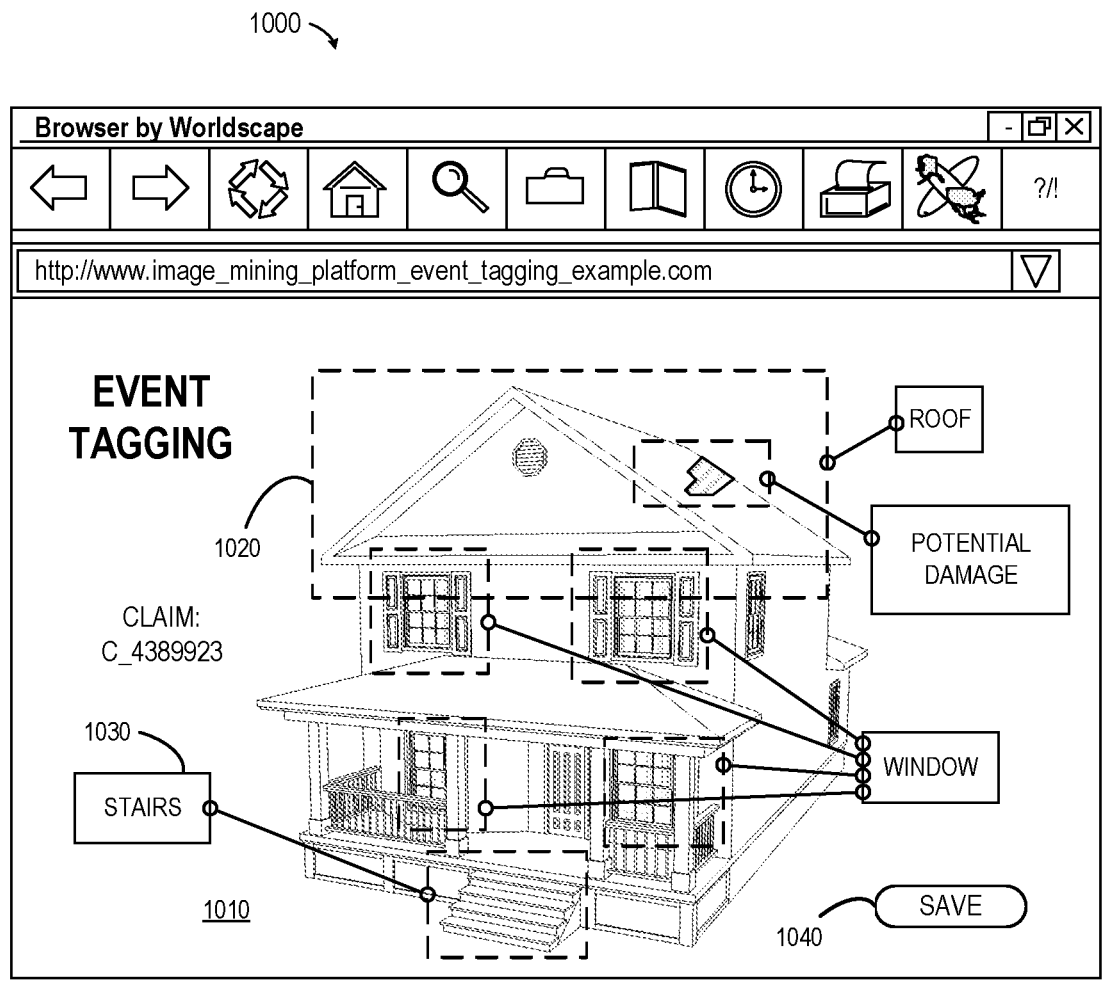
FIG. 10 illustrates a tagging graphical user interface in accordance with some embodiments of the present invention.

An administrator interface may display various graphical user interfaces to an administrator. For example, FIG. 10 illustrates a tagging graphical user interface 1000 in accordance with some embodiments of the present invention. The tagging interface 1000 may include an image 1010 (e.g., of a house as illustrated in FIG. 10). The system may evaluate the image 1010 and automatically determine a set of tags 1030 (e.g., roof, potential damage, window, stairs, etc.) that might be associated with the image 1010. Each tag 1030 might be displayed, for example, along with an indication of an image portion 1020 (as illustrated by the dashed rectangles in FIG. 10) that resulted in that tag 1030 being selected. According to some embodiments, an administrator may then adjust tags, add new tags, and/or save the set of event tags via selection of an icon 1040. As illustrated in FIG. 10, the event tagging display 1000 might be associated with a particular claim identifier 910 (e.g., "C_4389923"), event rule identifier 802 (e.g., "ER_100001" associated with "building damage"), loss event 904 (e.g., "hurricane"), etc.

Figure 11:
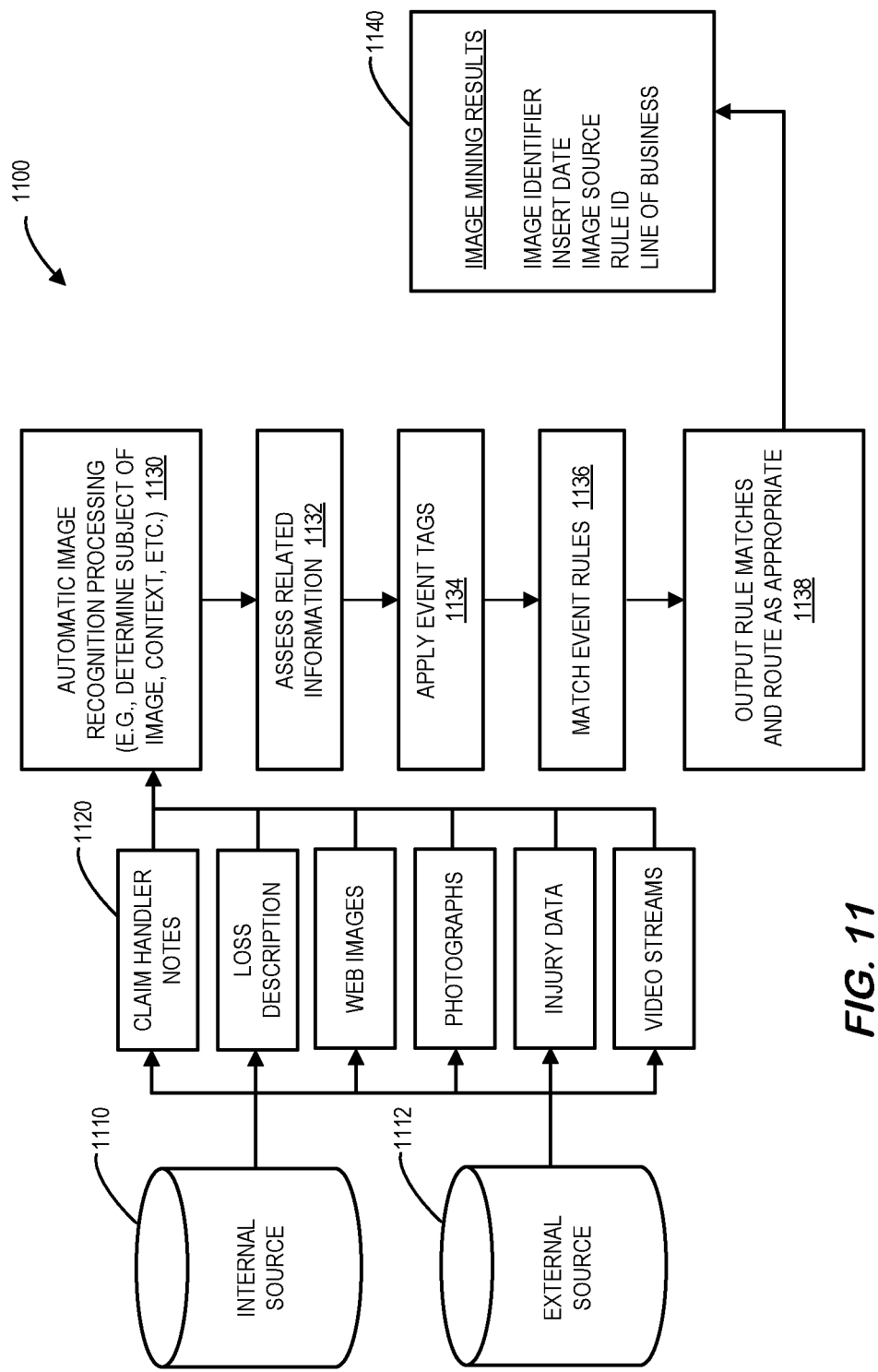
FIG. 11 illustrates a data flow according to some embodiments of the present invention.

FIG. 11 illustrates a data flow 1100 according to some embodiments of the present invention. Initially, image data may be pulled from one or more internal sources 1110 and/or external sources 1112 (e.g., on a daily basis). The pulled data may be associated with, for example, various insurance applications and/or data types 1120, such as claim handler notes, images associated with loss descriptions, injury photographs, web pictures, images associated with FNOL statements, video chat streams, etc. Note that other types of image information (e.g., weather maps or satellite photographs) might also be processed.

The pulled data may then be processed in accordance with any of the embodiments described herein (e.g., in connection with a master domain). In particular, images might be automatically processed at 1130 to determine the subject or connect associated with the image (e.g., a particular image might be associated with an insurance claim). Related information may be assessed at 1132, event tags may be applied at 1134, and event rules might be matched at 1136 (e.g., to determine that an image is associated with a building, an automobile, etc.). As a result of such processing, rule matches may be outputted and routed to an email server, workflow application, calendar application, etc. at 1138. For example, entries or records may be inserted into an image mining results database 1140 (e.g., including fields such as an image identifier, date of insertion, an image source, etc.). Note that a single input file or record might result in multiple results being inserted into the image mining results database 1140.

According to some embodiments, such a data flow 1100 may allow for the use of common domain image dictionaries (e.g., including building types, weather map patterns, facial recognition, etc.). Moreover, a composite image recognition rules library may provide for daily processing of image fields and rule changes may be tracked over time for analysis. In addition, performance monitoring might be performed in connection with indicator incidence rate trending and new rules can be introduced with minimal code changes. According to some embodiments, a batch process may create a history for new and/or changed rules associated with the data flow 1100.

According to some embodiments, the image mining associated with the data flow is a "big data" activity that may use machine learning to sift through large amounts of unstructured data to find meaningful patterns to support business decisions. As used herein, the phrase "big data" may refer to massive amounts of data that are collected over time that may be difficult to analyze and handle using common database management tools. This type of big data may include web data, business transactions, email messages, activity logs, and/or machine-generated data. In addition, data from sensors, unstructured image posted on the Internet, such as blogs and social media, may be included in embodiments described herein.

According to some embodiments, the image mining performed herein may be associated with hypothesis testing. For example, one or more theories may be provided (e.g., "the presence of snow on an outside staircase doubles the severity of an injury"). Knowledge engineering may then translate common smart tags for industry and scenario specific business context analysis.

In some embodiments, the image mining described herein may be associated with insight discovery wherein unsupervised data mining techniques may be used to discover common patterns in data. For example, highly recurrent themes may be classified, and other concepts may then be highlighted based on a sense of adjacency to these recurrent themes. In some cases, cluster analysis and drilldown tools may be used to explore the business context of such themes. For example, sentiment analysis may be used to determine how an entity is currently perceived and/or the detection of a real-world event may be triggered (e.g., it might be noted that a particular automobile model is frequently experiencing a particular unintended problem).

Figure 12:
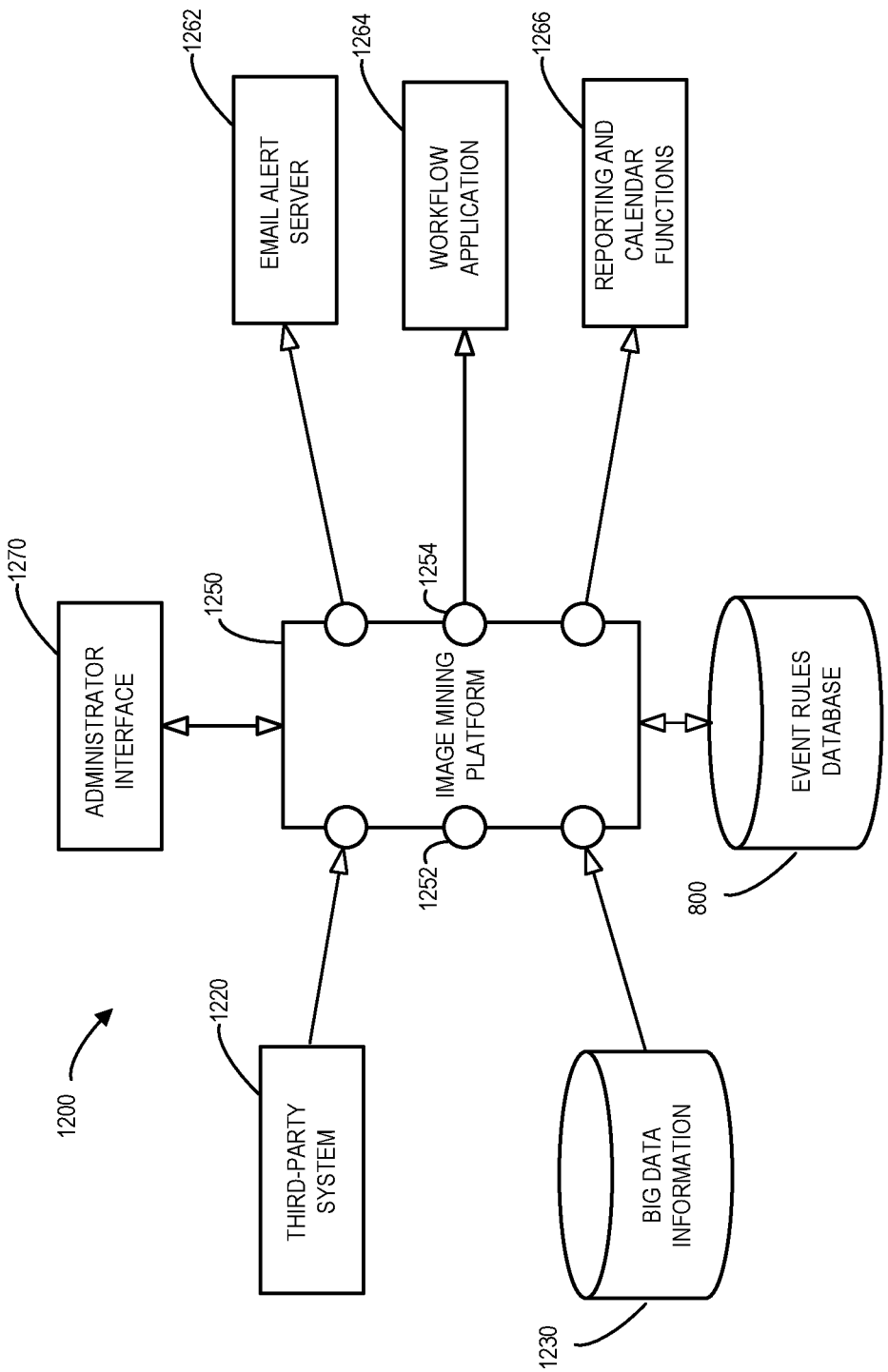
FIG. 12 is block diagram of a system according to some embodiments of the present invention.

FIG. 12 is block diagram of a system 1200 according to some embodiments of the present invention. As with the system of 350 of FIG. 3, the system 1200 includes an image mining platform 1250 that receives information from sources, including the rules database 800 (described with respect to FIG. 8), a third-party system 1220 (e.g., a hospital), and/or big data information 1230. The image mining platform 1250 might be, for example, associated with a PC, enterprise server, a server farm, etc.

According to some embodiments, an automated image mining platform 1250 may access rules in the event rules database 800 to mine the received images. The image mining platform 1250 may then transmit results to external systems, such as an email alert server 1262, a workflow application 1264, and/or reporting and calendar functions 1266 (e.g., executing on a server). According to some embodiments, a graphical administrator interface 1270 may provide an ability to access and/or modify the event rules database 800 via the image mining platform 1250. The administrator interface 1270 might, for example, let an administrator define image dictionaries, mapping rules, etc. associated with image mining.

The image mining platform 1250 may include a number of input nodes 1252 and/or output nodes 1254, such as nodes 1252, 1254 associated with protocols and/or Application Programming Interface ("API") connections. Information provided via the output nodes 1254 may, for example, be used to augment structured data as independent variables in predictive models (e.g., a fraud detection process might to look for a set of red flags, a large loss/volatile claims process might look for comorbidity, biological, psychological, and/or social conditions, and a premium evasion process might look for understatement of workforce given an image of a building and misclassified business flags).

The information provided via the output nodes 1254 may also, for example, act as an event detector to drive alerts to a business, to identify risk claims that merit re-scoring, to alert a business to a change in claim state for escalation or re-assignment, and/or to transmit alarms indicating the presence of a foreign manufacturer on a general liability claim. According to some embodiments, mined indicators from claims may be used to sample and/or compare risk policies (e.g., to compare policies based on the incidence rate of a particular type of roof damage on buildings).

Figure 13:
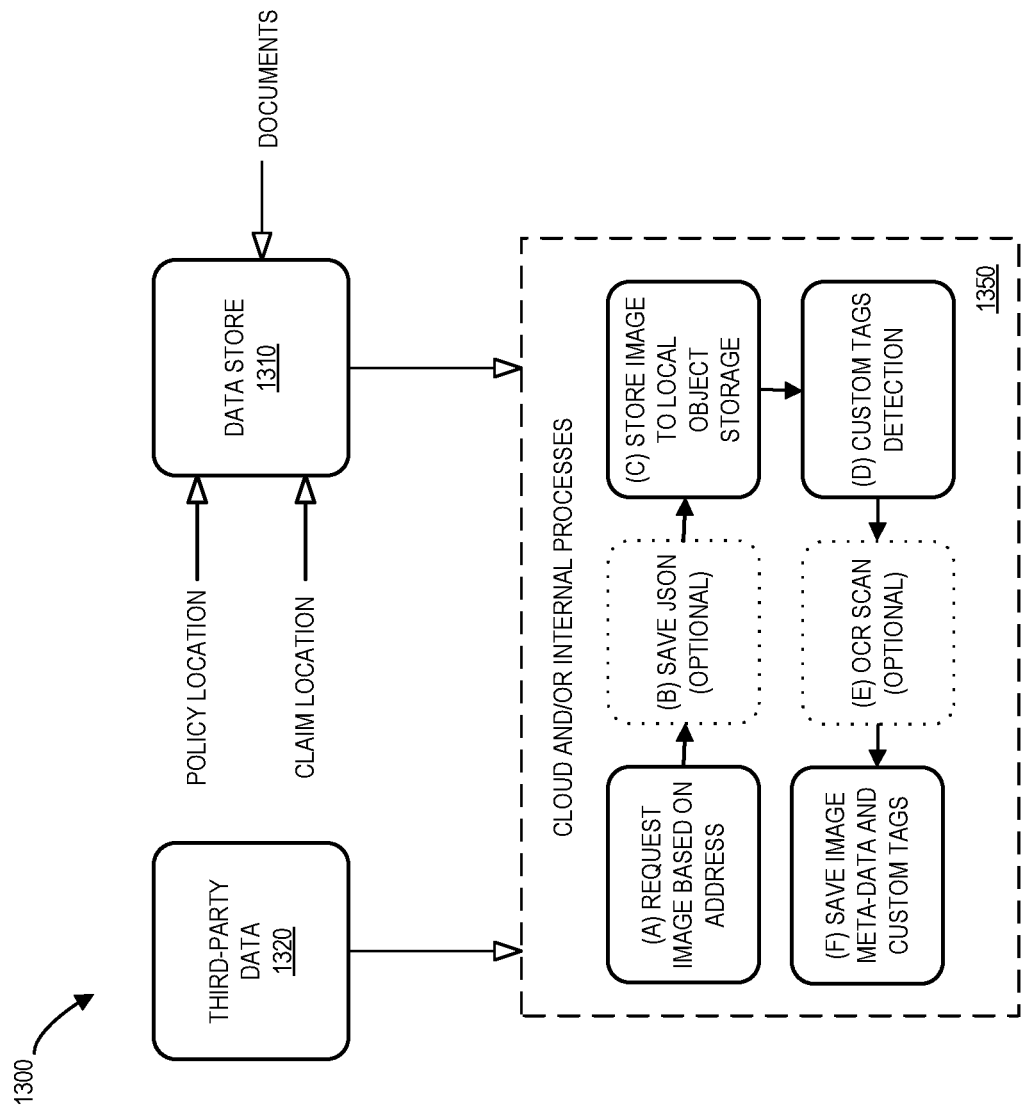
FIG. 13 is an image factory vision architecture in accordance with some embodiments.

FIG. 13 is an image factory vision architecture 1300 in accordance with some embodiments. Cloud and/or internal processes 1350 may receive image information from a data store 1310 (e.g., images from documents, an insurance policy location feed, an insurance claim location, etc.) along with third party data 1320. At (A), the system may request an image based on address (e.g., via GOOGLE® maps or similar service). Optionally, at (B) the system may save JavaScript Object Notation ("JSON") information about the image via human-readable text to transmit data objects consisting of attribute-value pairs, array data types, etc. At (C), the system may store the image and/or related information to object storage, and custom tags may be detected (e.g., via artificial intelligence or machine learning services) at (D). Optionally at (E), the system may perform Optical Character Recognition ("OCR") on the image to determine words or phrases located within the picture. At (F), the system may save the image meta-data and custom tags into an image factory data mart (e.g., in an SQL format).

Figure 14:
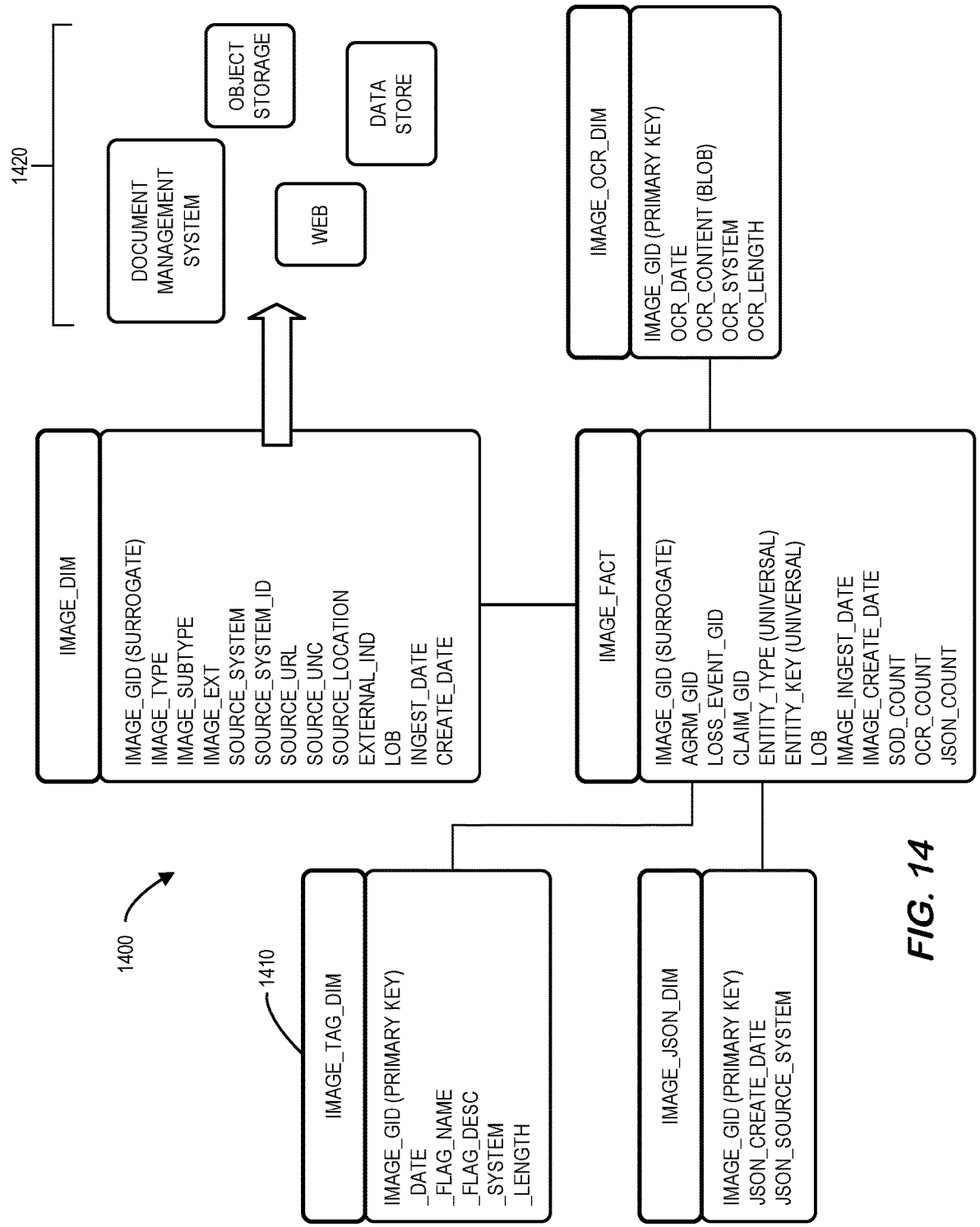
FIG. 14 illustrates an image factory vision dimensional data mart according to some embodiments.

FIG. 14 illustrates an image factory vision dimensional data mart 1400 that includes a number of elements 1410 according to some embodiments. For example, an image fact element might include data associated with an image element, an image tag element, an image JSON element, an image OCR element, etc. Examples of data that might be contained in these elements include an image identifier, an image primary key, an image type, an image source location, an ingest date, a creation date, a loss event identifier, a claim identifier, a policy identifier, a business name, a business address, a process identifier, one or more custom image tags (e.g., associated with custom image learning), a line of business, a training indicator, etc. Information from the image element may then be transmitted to, for example, a destination 1420 such as a document management system, a web location, object storage, a data store, etc.

Figure 15:
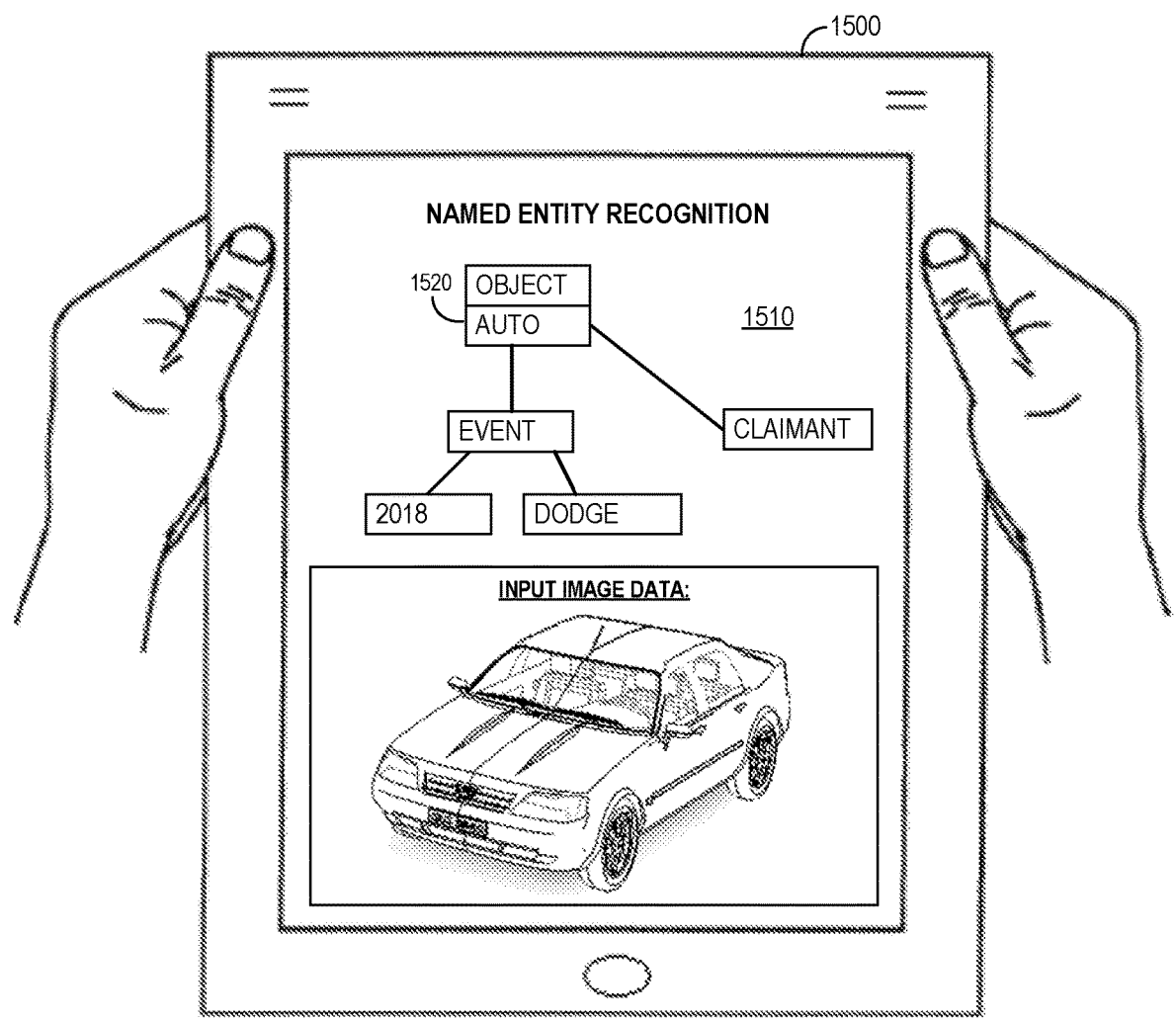
FIG. 15 illustrates a wireless or tabular device in accordance with some embodiments of the present invention.

FIG. 15 illustrates a wireless or tabular device 1500 displaying results 1510 of a named entity recognition process in accordance with some embodiments of the present invention. For example, in some embodiments, the device 1500 is an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity.

The device 1500 presents a display 1510 that may be used to graphically tie together various tags 1520 in association with an image (e.g., of an automobile as illustrated in FIG. 15). For example, the tags 1520 might indicate an object type and associated details associated with that particular object (e.g., an object owner, an automobile type, a year of manufacture, etc.). In this way, the display 1510 be used to review an automatically determined structure or hierarchy of data, adjust elements as appropriate, etc. (e.g., via a touch-screen interface of the device 1500).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Figure 16:
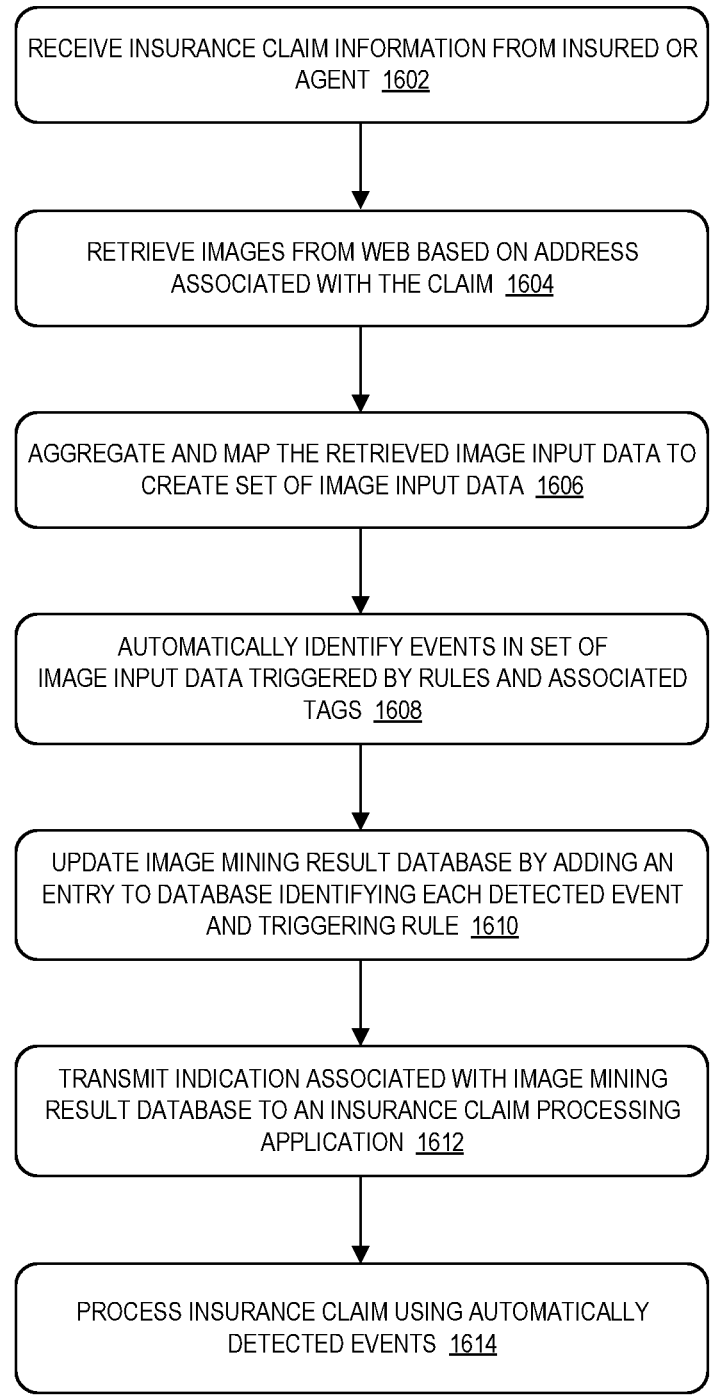
FIG. 16 is a business process flow that might be associated with one or more risk applications.

Applicants have discovered that embodiments described herein may be particularly useful in connection with insurance policies and associated claims. For example, FIG. 16 illustrates an insurance business process flow 1600 in accordance with some embodiments. At 1602, an insurer may receive insurance claim information from an insured or an insurance agent. At 1604, images may be retrieved from the web based on an address associated with the claim. At 1606, the system may aggregate and map the retrieved image input data to create a set of image input data (e.g., by combining images, removing duplicate images, etc.). At 1608, the system may automatically identify events (e.g., objects or item) in the set of image input data triggered by rules and associated tags. The system may update an image mining results database at 1610 to identify each detected event and triggering rule. At 1612, the system may transmit an indication associated with the image mining results database to an insurance claim processing application (e.g., using the data to automatically pre-populate a portion of an insurance claim form to reduce errors). At 1614, the system pay process the insurance claim using the automatically detected events. Note that other types of business and risk data may also benefit from the present invention. For example, embodiments might be used in connection with bank loan applications, warranty services, etc.

Moreover, although some embodiments have been described with respect to particular image mining approaches, note that any of the embodiments might instead be associated with other image processing techniques. For example, image processing may operate to mine certain characteristic information from various social networks to determine whether a party is engaging in certain risky behavior or providing high risk products. It is also contemplated that embodiments may process images including text in one or more languages, such English, French, Arabic, Spanish, Chinese, German, Japanese and the like. In an exemplary embodiment, a system can be employed for sophisticated image analyses, wherein image can be recognized irrespective of the image source. Any relationships between the various images can be clarified by using a rules engine that determines a distance, field-of-view, angle, etc. of an item within the images.

According to some embodiments, image data may be used in conjunction with one or more predictive models to take into account a large number of underwriting and/or other parameters. The predictive model(s), in various implementation, may include one or more of neural networks, Bayesian networks (such as Hidden Markov models), expert systems, decision trees, collections of decision trees, support vector machines, or other systems known in the art for addressing problems with large numbers of variables. Preferably, the predictive model(s) are trained on prior image data and outcomes known to the risk company. The specific image data and outcomes analyzed may vary depending on the desired functionality of the particular predictive model. The particular image data parameters selected for analysis in the training process may be determined by using regression analysis and/or other statistical techniques known in the art for identifying relevant variables and associated weighting factors in multivariable systems. The parameters can be selected from any of the structured data parameters stored in the present system (e.g., image tags and event data), whether the parameters were input into the system originally in a structured format or whether they were extracted from previously unstructured image, such as from big data.

In the present invention, the selection of weighting factors (either on an event level or an image source level) may improve the predictive power of the image mining. For example, more reliable image sources may be associated with a higher weighting factor, while newer or less reliable sources might be associated with a relatively lower weighting factor.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system for evaluating image data to support multiple insurance applications, comprising:
   a communication device to receive image input data from multiple sources, the sources including a medical report, a police report, social network data, Internet of Things (IoT) data, Global Positioning System data, satellite photo data, activity tracking data, loss descriptions, injury descriptions, a Final Notice of Loss statement and a video teleconference;
   a processor coupled to the communication device;
   a storage device in communication with said processor and storing instructions adapted to be executed by said processor to:
      aggregate and map the received image input data to create a set of image input data;
      automatically detect an insurance claim in the set of image input data triggered by a rule and an associated tag, said detecting including processing the image input data via an analytics engine and applying, via machine learning, at least one pre-determined condition to the image input data reducing a number of messages transmitted via a communication network, wherein the analytics engine is trained via machine learning processes with training data and non-training data resulting from a filter applied to a prediction set of image input data,
      flag the detected insurance claim as meeting the pre-determined condition,
      update an image mining result database, responsive to the flag, by adding an entry to the database identifying each detected insurance claim and the triggering rule,
      transmit an indication associated with the image mining result database to a plurality of insurance applications, at least one of the plurality of insurance applications associated with a predictive model, the predictive model including a neural network and a support vector machine, said plurality of insurance applications including a subrogation software application, a fraud detection software application and a recovery factor analysis software application;
      display an image from the database on a handheld computing device, the image showing an object with associated tags, the associated tags presented in the image as a data hierarchy tree, the hierarchy tree formed of a plurality of nodes and branches, and the associated tags ranked in the hierarchy tree according to a relative status of the associated tags,
      adjust the data hierarchy tree in response to input from a user of the handheld computing device,
      automatically update the triggering rule based on corrections of image data evaluations manually inputted into the system, and
      update at least one variable or weighing factor of the predictive model;
   an email alert server in communication with the processor to receive results of image data processing performed by the processor;
   a workflow application in communication with the processor to receive results of image data processing performed by the processor; and
   a server executing reporting and calendar functions, said functions in communication with the processor to receive results of image data processing performed by the processor; and
   automatically train the machine learning processes using the received results of image data processing.

2. The system of claim 1, wherein execution of the stored instructions further causes the processor to:
   receive, from at least one of the insurance applications, feedback information associated with the detected insurance claim, and based on the received feedback information, automatically update at least one of the rule and the associated tag.

3. The system of claim 1, wherein the insurance applications are associated with at least two of: (i) a workers' compensation claim, (ii) a personal insurance policy, (iii) a business insurance policy, (iv) an automobile insurance policy, (v) a home insurance policy, (vi) a sentiment analysis, (vii) risk event detection, (viii) a cluster analysis, (ix) a predictive model, (x) large loss and volatile claim detection, (xi) a premium evasion analysis, (xii) an insurance policy comparison, (xiii) an underwriting decision, and (xiv) indicator incidence rate trending.

4. The system of claim 1, wherein the transmitted indication is to: (i) trigger an insurance application, or (ii) update an insurance application.

5. The system of claim 1, wherein the transmitted indication is associated with a variable or weighing factor of a predictive model.

6. The system of claim 1, wherein multiple versions of the rule are maintained along with multiple versions of the image mining result database.

7. The system of claim 1, wherein the insurance claim is associated with at least one of: (i) an item present within the image, and (ii) an activity associated with the image.

8. The system of claim 1, wherein the triggering rule was defined by an administrator using a graphical user interface.

9. The system of claim 1, wherein the entry added to the image mining result database includes all of: (i) an image identifier, (ii) an insert date, (iii) an image source, (iv) a rule identifier, and (v) a line of business.

10. The system of claim 1, wherein the storage device further stores instructions adapted to be executed by said processor to:
    identify at least a portion of the image input data as being connected with an image domain, and
    associate that portion of the image input data with a custom tag based on the image domain.

11. The system of claim 1, wherein said automatic detection is performed via cloud analytics associated with at least one of: (i) object storage, (ii) a data catalog, (iii) a data lake store, (iv) a data factory, (v) machine learning, and (vi) artificial intelligence services.

12. The system of claim 1, wherein: the object shown in the displayed image is an automobile; and the tags shown with the object in the displayed image include an object type tag, an object owner tag, an automobile type tag, and a year of manufacture tag.

13. The system of claim 1, wherein the at least one pre-determined condition is at least one of:
    a pre-determined number of times an item is detected; and
    a pre-determined proximity between a first item and a second item.

14. A computer-implemented method for evaluating image data to support multiple insurance applications, comprising:
    receiving, at an image mining platform in a system, image input data from multiple sources including a source internal to an insurance enterprise and a source external to the insurance enterprise, the sources including a medical report, a police report, social network data,, Internet of Things (IoT) data, Global Positioning System data., satellite photo data, activity tracking data, loss descriptions, injury descriptions, a Final Notice of Loss statement and a video teleconference;
    aggregating and mapping the received image input data to create composite input image data;
    automatically detecting, by a computer processor of the image mining platform, an insurance claim in the set of image input data triggered by a rule and an associated tag, said detecting including processing the image input data via an analytics engine and applying, via machine learning, at least one pre-determined condition to the image input data reducing a. number of messages transmitted via a communication network, wherein the analytics engine is trained via machine learning processes with training data and non-training data resulting from a. filter applied to a prediction set of image input data;
    updating, by the computer processor, an image mining result database by adding an entry to the database, the entry including: (i) an image identifier, (ii) an insert date, (iii) an image source, (iv) a rule identifier, and (v) a line of business;
    transmitting, by the computer processor, an indication associated with the image mining result database to a plurality of insurance applications, at least one of the plurality of insurance applications associated with a predictive model, the predictive model including a neural network and a support vector machine, said plurality of insurance applications including a subrogation software application, a fraud detection software application and a recovery factor analysis software application;
    displaying an image from the database on a handheld computing device, the image showing an object with associated tags, the associated tags presented in the image as a data hierarchy tree, the hierarchy tree formed of a plurality of nodes and branches, and the associated tags ranked in the hierarchy tree according to a relative status of the associated tags;
    adjusting the data hierarchy tree in response to input from a user of the handheld computing device;
    automatically updating the triggering rule based on corrections of image data evaluations manually inputted into the system,
    updating at least one variable or weighing factor of the predictive model;
    receiving results of image data processing by the computer processor by an email alert server in communication with the computer processor;
    receiving results of image data processing by the computer processor by a workflow application in communication with the computer processor; and
    receiving results of image data processing by the computer processor by reporting and calendar functions executed by a server, the reporting and calendar functions in communication with the computer processor; and
    automatically training the machine learning processes using the received results of image data processing.

15. The method of claim 14, wherein the insurance applications are associated with at least two of: (i) a workers' compensation claim, (ii) a personal insurance policy, (iii) a business insurance policy, (iv) an automobile insurance policy, (v) a home insurance policy, (vi) a sentiment analysis, (vii) risk event detection, (viii) a cluster analysis, (ix) a predictive model, (x) large loss and volatile claim detection, (xi) a premium evasion analysis, (xii) an insurance policy comparison, (xiii) an underwriting decision, and (xiv) indicator incidence rate trending.

16. The method of claim 14, further comprising:
    identifying at least a portion of the image input data as being connected with an image domain; and
    associating that portion of the image input data with a custom tag based on the image domain.

17. The method of claim 14, wherein said identifying is performed at least one of: (i) on a periodic basis, (ii) upon a change in the image input data, (iii) on a daily basis, and (iv) responsive to a request.

18. A non-transitory computer-readable medium storing instructions adapted to be executed by a computer processor to perform a method, said method comprising:
    receiving, by a system, image input data from multiple sources, the sources including a medical report, a police report social network data, Internet of Things (IoT) data, Global Positioning System data, satellite photo data, activity tracking data, loss descriptions, injury descriptions, a Final Notice of Loss statement and a video teleconference;
    aggregating and mapping the received image input data to create a set of image input data;

automatically detecting an insurance claim in the set of image input data triggered by a rule and an associated tag, said detecting including processing the image input data via an analytics engine and applying, via machine learning, at least one pre-determined condition to the image input data reducing a number of messages transmitted via a communication network, wherein the analytics engine is trained via machine learning processes with training data and non-training data resulting from a filter applied to a prediction set of image input data;

updating an image mining result database by adding an entry to the database identifying each detected insurance claim and the triggering rule;

transmitting an indication associated with the image mining result database to a plurality of insurance applications, at least one of the plurality of insurance applications associated with a predictive model, the predictive model including a neural network and a support vector machine, said plurality of insurance applications including a subrogation software application, a fraud detection software application and a recovery factor analysis software application;

displaying an image from the database on a handheld computing device, the image showing an object with associated tags, the associated tags presented in the image as a data hierarchy tree, the hierarchy tree formed of a plurality of nodes and branches, and the associated tags ranked in the hierarchy tree according to a relative status of the associated tags, adjusting the data hierarchy tree in response to input from a user of the handheld computing device;

automatically updating the triggering rule based on corrections of image data evaluations manually inputted into the system, updating at least one variable or weighing factor of the predictive model;

receiving results of image data processing by the computer processor by an email alert server in communication with the computer processor;

receiving results of image data processing by the computer processor by a workflow application in communication with the computer processor; and receiving results of image data processing by the computer processor by reporting and calendar functions executed by a server, the reporting and calendar functions in communication with the computer processor; and automatically train the machine learning processes using the received results of image data processing.

19. The medium of claim 18, wherein the method further comprises; identifying at least a portion of the image input data as being connected with an image domain; and associating that portion of the image input data with a custom tag based on the image domain.

20. The medium of claim 18, wherein said automatic detection is performed via cloud analytics associated with at least one of: (i) object storage, (ii) a data catalog, (iii) a data lake store. (iv) a data factory, (v) machine learning, and (vi) artificial intelligence services.

21. The medium of claim 19, wherein said identifying is performed at least one of: (i) on a periodic basis, (ii) upon a change in the image input data, (iii) on a daily basis, and (iv) responsive to a request.

* * * * *